United States Patent [19]

Gordon

[11] 3,816,803

[45] June 11, 1974

[54] CHARGING A CAPACITOR TO REPRESENT SUM AND DIFFERENCE VOLTAGES

[75] Inventor: Bernard M. Gordon, Magnolia, Mass.

[73] Assignee: Gordon Engineering Company, Wakefield, Mass.

[22] Filed: Feb. 7, 1973

[21] Appl. No.: 330,446

Related U.S. Application Data

[60] Continuation of Ser. No. 82,139, Oct. 19, 1970, abandoned, which is a division of Ser. No. 843,485, July 22, 1969, Pat. No. 3,588,881.

[52] U.S. Cl. .................... 320/1, 324/111
[51] Int. Cl. .................... H03k 17/00, G01r 17/04
[58] Field of Search .................... 320/1; 324/111, 140 R; 307/109

[56] References Cited

UNITED STATES PATENTS 2,579,277 12/1951 Stanton .................... 320/1
2,843,736 7/1958 Huntley .................... 320/1
3,050,673 8/1962 Widmer .................... 320/1

*Primary Examiner*—Bernard Konick
*Assistant Examiner*—Stuart N. Hecker
*Attorney, Agent, or Firm*—Morse, Altman, Oates & Bello

[57] ABSTRACT

A method of charging a capacitor having a first signal applied to one terminal thereof, a unipolar reference signal and a ground signal operatively connected to another terminal thereof for providing bipolar reference signals from the unipolar reference signal by selectively applying the unipolar reference signal and the ground signal to the other terminal of the capacitor.

1 Claim, 4 Drawing Figures

CHARGING A CAPACITOR TO REPRESENT SUM AND DIFFERENCE VOLTAGES

CROSS-REFERENCES TO RELATED APPLICATIONS

The present application is a continuation of U.S. Pat. Ser. No. 82,139, filed Oct. 19, 1970, now abandoned, which is a division of U.S. Pat. Ser. No. 843,485, filed July 22, 1969 now U.S. Pat. No. 3,588,881.

BACKGROUND AND SUMMARY OF THE INVENTION

The present invention relates to data form converters and more particularly to analog to digital cyclic converters employing the capacitive transfer technique. In the capacitive transfer technique, data form conversion is accomplished by switching, in a logically programmed sequence, the input and output of an amplifier to a first and a second capacitor. The sequence of switching is such that the amplifier output is connected to the first capacitor when the amplifier input is connected to the second capacitor and the amplifier output is connected to the second capacitor when the amplifier input is connected to the first capacitor. Restoring cyclic converters have suffered from long conversion times as a result of restoring a signal as at the amplifier input to a positive polarity when the previous switching sequence has caused a signal of negative polarity to be presented thereat.

A primary object of the present invention is to provide a non-restoring cyclic converter characterized by an input terminal for receiving an input signal, a bipolar reference supply for supplying bipolar reference signals, an amplifier having a first and a second input, the input signal is applied to the first input, and the bipolar reference signal is applied to the second input, a pair of capacitors, each alternately receiving a signal from an output of the amplifier and alternately supplying a signal to the first input, a plurality of switching devices for controlling the signals which are applied to each of the inputs and each of the capacitors, a control flip-flop for specifying the state of the switching devices which control the reference signal applied to the second input, a programmer for specifying the state of the switching devices controlling the signals which are applied to the first input and to each of the capacitors, a comparator for controlling the control flip-flop and the programmer, and a register for recording the signal as the output of the comparator, whereby the recorded signal is the binary form of the input analog signal. The combination of input terminal, bipolar reference supply, amplifier, capacitors, switching device, control flip-flop, comparator, programmer, and register is such as to provide a precise, reliable, and expeditious cyclic converter. Another object of the present invention is to provide a Binary Coded Decimal (BCD) cyclic converter an display characterized by a non-restoring cyclic converter supplemented with an additional amplifier for providing a BCD signal to a four bit shift register, a decoder for decoding the BCD signal stored in the shift register, and a display for presenting the input analog signal in digital form. A further object of the present invention is to provide a capacitive — reference voltage switching technique characterized by a pair of switching devices for controlling a ground signal and a reference signal which are applied to a capacitor. The reference signal is applied to the capacitor through a first of the switching devices and the ground signal is applied to the capacitor through a second of the switching devices in such a manner that a bipolar reference switching effect is provided by unipolar reference.

The invention accordingly comprises the apparatus possessing the construction, combination of elements, and arrangement of parts that are exemplified in the foregoing detailed disclosure, the scope of which will be indicated in the appended claims.

BRIEF DESCRIPTION OF DRAWINGS

For a fuller understanding of the nature and objects of the present invention, reference should be had to the following detailed description taken in connection with the accompanying drawings wherein.

DETAILED DESCRIPTION

Figure 1:
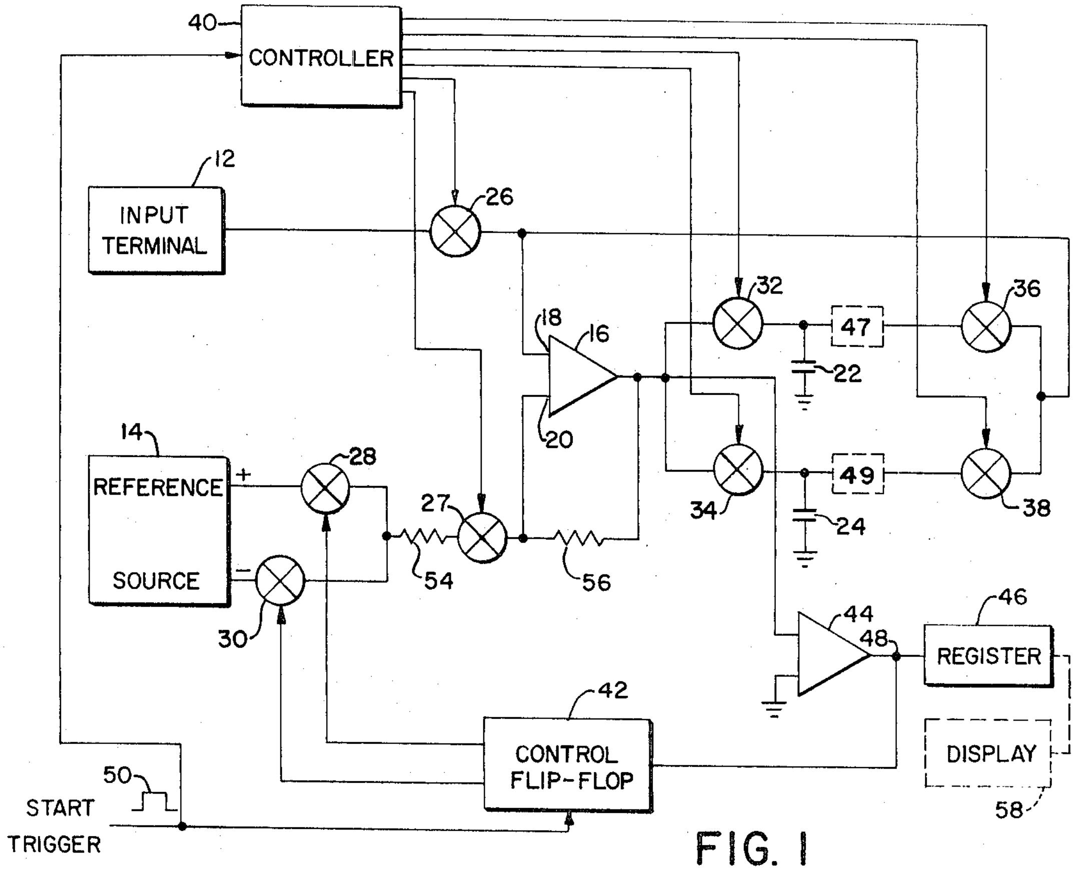
FIG. 1 is a block and schematic diagram of a non-restoring binary cyclic analog to digital converter embodying the present invention.

Generally, the non-restoring binary cyclic analog to digital converter of FIG. 1 comprises an input terminal 12 for receiving an analog signal, a reference source 14 for supplying bipolar reference signals, an amplifier 16 having a non-inverting input 18 and an inverting input 20, a pair of capacitors 22 and 24, each alternately providing an input signal at amplifier 16, a plurality of switching devices 26, 27, 28, 30, 32, 34, 36, and 38 for controlling the signals applied to inputs 18 and 20 and capacitors 22 and 24, a controller 40 for specifying the conduction state of switches 26, 27, 32, 34, 36, and 38, a control flip-flop 42 for controlling the conduction state of switches 28 and 30, a comparator 44 for controlling the state of control flip-flop 42, and a register 46 for recording the analog signal in digital form. In an optional configuration, high impedance, gain of one buffer amplifiers 47 and 49 are provided in order to minimize conversion errors when switches 36 and 38 are turned on. In the following discussion, for convenience, a positive and a zero signal at an output of amplifier 16 produces a ONE at an output 48 of comparator 44 and a negative signal at the output of amplifier 16 produces a ZERO at output 48. The ONE as at 48 causes control flip-flop 42 to be in a state ONE and the ZERO output as at 48 causes the control flip-flop to be in a state ZERO.

In the converter of FIG. 1, conversion is accomplished by a plurality of decisions, the first decision being a determination of the polarity of the analog signal and the remainder being a determination of the magnitude of the analog signal. Conversion is initiated by a start trigger 50, for example, which is applied to controller 40 and control flip-flop 42. Switches 26, and 32 are turned-on and switches 27, 28, 30, 34, 36, and 38 are turned-off. The analog signal as at input terminal 12 is applied to input 18 via switch 26. An output from amplifier 16, which has the same magnitude and polarity of the signal as at 18, is applied to capacitor 22 via switch 32 and a charge is built up on capacitor 22. If the analog signal as at 18 is positive, a ONE is presented at output 48 of comparator 44 and if the analog signal as at 18 is negative, a ZERO is presented at output 48. The signal as at 48, either ONE or ZERO is recorded in register 46 and the first decision is completed. Control flip-flop 42 is triggered into either state ONE or state ZERO by the signal as at 48. If the analog signal as at input terminal 12 is positive the output 48 of comparator 44 is recorded in register 46 for the second through fifth decisions. If the analog signal as at input terminal 12 is negative, the complement of the signal as at 48 is recorded in register 46 for the second through fifth decisions. Zero volts as at the output of amplifier 18 is recorded in register 46 as a ONE. In the second decision, the charge as on capacitor 22 is applied to input 18 of amplifier 16 via switch 36 and the reference voltage is applied to input 20 via switch 27 and either switch 28 or switch 30. If the output as at 48, upon completion of the previous decision, in this case the first decision, is ONE, control flip-flop 42 is in state ONE and switch 28 is turned-on. If the output as at 48 is ZERO, the control flip-flop is in state ZERO and switch 30 is turned-on. A positive reference signal is applied to input 20 via switches 27 and 30 28 and a negative reference signal is applied to input 20 via switches 27 and 30. Furthermore, in the second decision, switch 34 is turned-on and the signal as at the output of amplifier 16 is applied to capacitor 24. The signal as at the output of 16 also is applied to comparator 44 and either ONE or ZERO is presented at output 48. The ONE or ZERO as at 48 is recorded in register 46 and the second decision is completed. In the third decision, which is operationally analogous to the second decision, the charge on capacitor 24 is applied to input 18 and the output of 16 is applied to capacitor 22. The fourth and fifth decisions are accomplished in a manner similar to the second and third decisions, respectively. For a clearer understanding of the operation of the converter of FIG. 1, reference will be made to a typical conversion. In one example, the analog input as at input terminal 12 is a +9 volts, the reference signals are positive and −16 volts, and the gain of amplifier 16 is two, i.e., resistors 54 and 56 are of equal ohmic value. The output signal $Eo_2$ from amplifier 16 is given by the expression $$Eo_2 = 2\ (E_{in} - E_{Ref/2})$$

where $E_{in}$ is the signal which is applied to input 18 and $E_{Ref}$ is the reference signal which is applied to input 20. As previously stated, capacitor 22 is charged to the analog input voltage $E_{in}$ during the first decision, i.e., +9 volts. Upon completion of the first decision, a ONE is stored in register 46 and control flip-flop 42 is in state ONE. When control flip-flop 42 is in state ONE, switch 30 is turned off. In the second decision, switches 27, 28, 34, and 36 are turned-on and switches 26, 30, 32, and 38 are turned-off. The charge on capacitor 22, is applied to input 18 via switch 36 and the positive $E_{Ref}$ is applied to input 20 via switches 27 and 28. The output of amplifier 16 is $$Eo_2 = 2\ (E_{in} - E_{Ref/2})$$

Where $Eo_2$ is the output of amplifier 16 for the second decision and $E_{in}$ is the signal applied to input 18. The output $Eo_2$ is applied to capacitor 24 via switch 34 and capacitor 24 is charged to a +2 volts. The positive output voltage as at amplifier 16 produces a ONE at output 48 of comparator 44. The ONE as at 48 is stored in register 46 as the most significant bit and also is applied to control flip-flop 42. In the third decision, switches 27, 28, 32, and 38 are turned-on and switches 26, 30, 34, and 36 are turned-off. The +2 volt charge on capacitor 24 is applied to input 18 via switch 38 and the positive $E_{Ref}$ is applied to input 20 via switches 27 and 28. The output of amplifier 16 is a −12 volts. Capacitor 22 is charged to −12 volts via switch 32. The negative output voltage as at amplifier 16 produces a ZERO at output 48 of comparator 44. The ZERO as at 48 is stored in register 46 and also is applied to control flip-flop 42. In the fourth decision, switches 27, 30, 34, and 36 are turned-on and switches 26, 28, 34, and 38 are turned-off. The −12 volt charge on capacitor 22 is applied to input 18 via switch 36 and the negative $E_{Ref}$ is applied to input 20 via switches 27 and 30. The output of amplifier 16 is a −8 volts and capacitor 24 is charged to a −8 volts via switch 34. The negative output as at amplifier 16 produces a ZERO at output 48 of comparator 44. The ZERO as at 48 is stored in register 46 and also is applied to control flip-flop 42. In the fifth decision, switches 27, 30, 32, and 38 are turned-on and switches 26, 28, 34, and 36 are turned-off The −8 volt charge on capacitor 24 is applied to input 18 via switch 38 and the negative $E_{Ref}$ is applied to input 20 via switches 27 and 30. The output of amplifier 16 is zero volts. The zero output as at the output of amplifier 16 produces a ONE at output 48 of comparator 44. The ONE as at 48 is stored in register 46. The signal stored in register 46 during the second through fifth decision, inclusive, is 1001, which is the binary code for nine. In a modified configuration, the signal as in register 46 is applied to a display 58, for example, a numerical indicator, and the input analog signal is presented thereon in digital form. In the illustrated converter of FIG. 1, there are five decisions. It will be understood that, in alternative embodiments, the number of decisions is other than five, for example, six.

Figure 2:
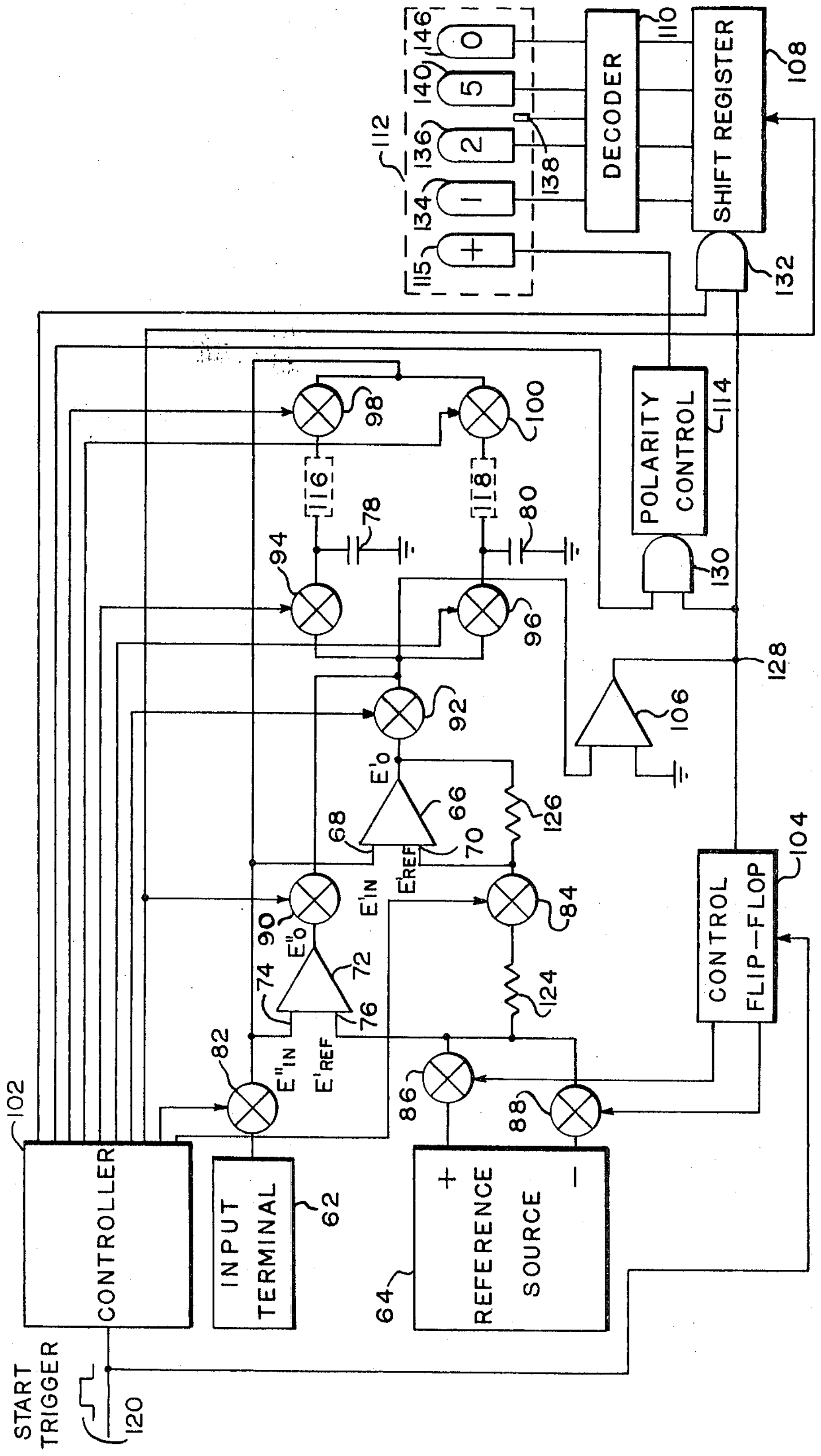
FIG. 2 is a block and schematic diagram of a non-restoring BCD cyclic analog to digital converter embodying the present invention.

FIG. 2 illustrates a non-restoring BCD cyclic analog to digital converter. Generally, the converter of FIG. 2 comprises an input terminal 62 for receiving an analog signal, a reference source 64 for supplying bipolar reference signals, an amplifier 66 having a non-inverting input 68 and an inverting input 70, an amplifier 72 having a non-inverting input 74 and an inverting input 76, a pair of capacitors 78 and 80 for providing an input signal at non-inverting inputs 68 and 74, a plurality of switching devices 82, 84, 85, 86, 88, 90, 92, 94, 96, 98, and 100 for controlling the signals applied to amplifiers 66 and 72 and capacitors 78 and 80, a controller 102 for specifying the conduction state of switches 82, 84, 90, 92, 94, 96, 98, and 100, a control flip-flop 104 for specifying a conduction state of switches 86 and 88, a comparator 106 for controlling a state of control flip-flop 104, a shift register 108 for registering the analog signal in binary code, a decoder 110 for decoding the binary signal in shift register 108, a display 112 for presenting the analog signal in numerical form, and a polarity control 114 for controlling a "+" and "−" indicator 115, for example, in display 112. In an optional configuration, high impedance, gain of one buffer amplifiers 116 and 118 are provided in order to minimize conversion errors when switches 98 and 100 are turned-on.

In the converter of FIG. 2, conversion is accomplished by a plurality of decisions, the first decision being a determination of the polarity of the analog signal and the remainder being a determination of the magnitude of the analog signal. Conversion is initiated by a start trigger 120, for example, which is applied to controller 102 and control flip-flop 104. Switches 82, 92, and 94 are turned-on and switches 84, 86, 88, 90, 96, 98, and 100 are turned-off. The analog signal as at input terminal 62 is applied to input 68 via switch 82. Resistors 124 and 126 are of equal ohmic value and the gain of amplifier 66 is TWO. An output from amplifier 66, which is the same magnitude and polarity of the signal as at 68, is applied to capacitor 78 via switches 92 and 94 and a charge is built-up on capacitor 78. If the analog signal as at 68 is positive, a ONE is presented at output 128 of comparator 106 and if the analog signal as at 68 is negative, a ZERO is presented at output 128. The signal as at 128 and signal from controller 102 are applied to a logic circuit 130. An output from polarity control 114 is applied to "+" and "—" indicator 115 is display 112. If the signal as at 128 is positive, a "+" is presented in display 112 and if the signal as at 128 is negative, a "—" is presented in display 112. If the analog signal as at the output of amplifier 66 is positive upon completion of the first decision, the signal as at output 128 of comparator 106 is recorded in shaft register 108 for the second through fifth decisions. When the analog signal as at the output of amplifier 66 is negative upon completion of the first decision, the complement of the signal as at output 128 of comparator 106 is recorded in shift register 108 for the second through fifth decisions. If the output of amplifier 66 is positive upon completion of the sixth decision, the signal as at output 128 is recorded in shift register 108 for the seventh through tenth decisions. When the output of amplifier 66 is negative upon completion of the sixth decision, the complement of the signal as at 128 output is recorded in shift register 108 for the seventh through tenth decisions. Zero volts as at the output of amplifier 66 is recorded in shift register 108 as a ONE. In one example, the analog input as at input terminal 62 is a +12½ volts, the reference signals are positive and −16 volts, the gain of amplifier 66 is two, and the gain of amplifier 72 is five-eighths. The output signal Eo ′ of amplifier 66 is given by the expression $$E_o{}' = 2\,(E_{in} - E'_{Ref/2})$$

Where $E'_{in}$ is the signal applied to input 70 and $E'_{Ref}$ is the reference signal from 64. The output signal $E_o'' = \frac{5}{8}(E''_{in} - E'_{Ref})$ Where $E''_{in}$ is the signal applied to input 74. As previously stated, capacitor 78 is charged to the value of analog input voltage during the first decisions, i.e., +12½ volts. Upon completion of the first decision, control flip-flop 104 is in state ONE, there being a positive voltage at 128, switch 86 is turned-on, and switch 88 is turned-off. In the second decision, switches 84, 92, 96, and 98 are turned-on an switches 82, 90, 94, and 100 are turned-off. The charge on capacitor 78, is applied to amplifier 66 via switch 98 and the positive $E'_{Ref}$ is applied to input 70 via switches 84 and 86. The output of amplifier 66 is $E_o{}'_2 = 2\,(E'_{in} - E'_{Ref/2})$ Where $E_o{}'_2$ is the output of amplifier 66 for the second decision. The output $E_o{}'_2$ is applied to capacitor 80 via switch 92 and 96 and capacitor 80 is charged to a +9 volts. The positive output as at amplifier 16 produces a ONE at output 128 of comparator 106. The ONE output as at 128 and a signal from controller 102 are applied to a logic circuit 132 and a ONE is stored in shift register 108. The ONE output as at 128 also is applied to control flip-flop 104. In the third decision switches 84, 86, 92, 94, and 100 are turned-on and switches 82, 88, 90, 96, and 98 are turned-off. The +9 volts charge on capacitor 80 is applied to input 68 via switch 100 and the plus $E_{Ref}$ is applied to input 70 via switches 84 and 86. The output of amplifier 66 is a +2 volts. Capacitor 78 is charged to +2 volts via switches 92 and 94. As in the second decision, d ONE is stored in shift register 108. In the fourth and fifth decisions, the state of the switches 82, 84, 90, 92, 94, 96, 98, and 100 are the same state as in decisions two and three, respectively. In the fourth decision, the output of amplifier 66 is −12 volts and in the fifth is −8 volts. Upon completion of the fifth decision, 1100 is stored in shift register 108. In the sixth decision, switches 88, 90, 96, and 98 are turned-on and switches 82, 84, 86, 92, 94, and 100 are turned-off. A signal from controller 102 is applied to shift register 108 and 1100 stored therein is shifted to decoder 110. The transferred signal is decoded and is applied to display devices 134 and 136, for example, numerical indicators. A numeral "1" is presented on numerical indicator 134, a numeral "2" is presented on numerical indicator 136, and a decimal point 138 is presented, by conventional means, between numerical display devices 136 and 140. The −8 volt charge on capacitor 78, the output of amplifier 66 during the fifth decision, is applied to input 74 of amplifier 72 via switch 98. The −16 volt reference is applied to input 76 of amplifier via switch 88. The output E0″ of amplifier 72 is $$E_o{}' = \tfrac{5}{8}\,(E''_{in} - E'_{Ref})$$
$$= +\,5 \text{ volts}$$

The output E0″ is applied to capacitor 80 via switches 90 and 96 and capacitor 80 is charged to a +5 volts. Decisions two three, four, and five are repeated as decisions seven, eight, nine, and 10. Decision six is then repeated as decision 11. Upon completion of decision 11, a numerical indicator, and the output from amplifier 72 is zero. Since the output from amplifier 72 is zero, a "0" is presented on display device 146, for example, a numerical indicator. In the illustrated converter of FIG. 2, there are 11 decisions. It will be understood that, in alternative embodiments, the number of decisions is other than 11, for example, 16.

Figure 3:
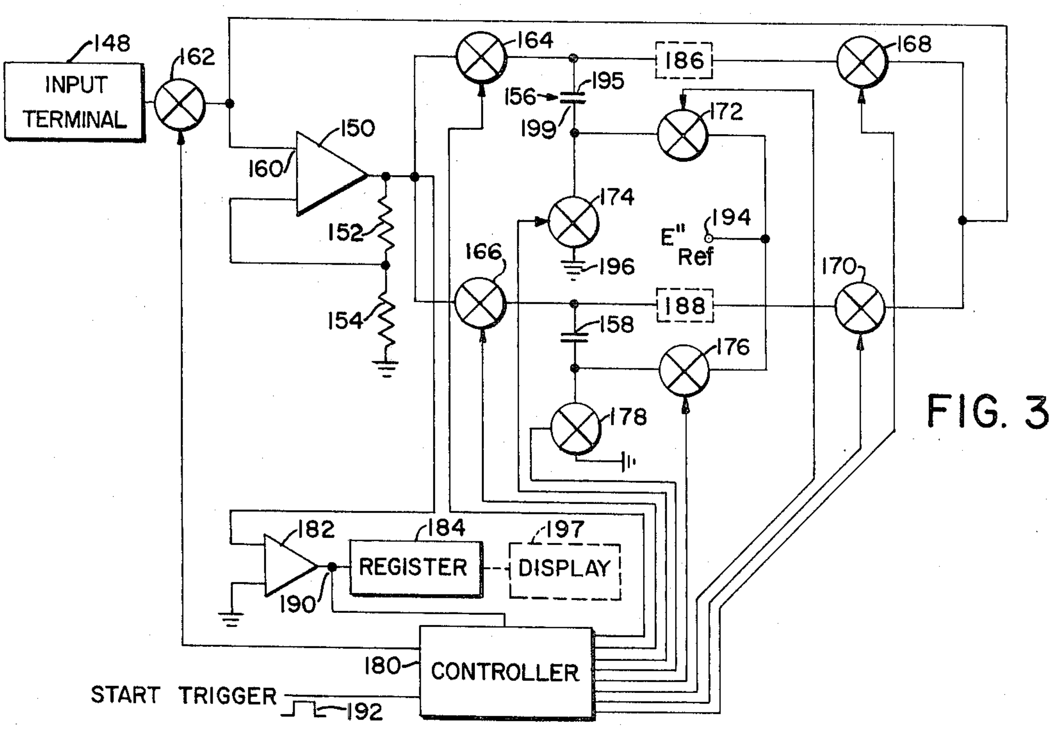
FIG. 3 is a block and schematic diagram of a non-restoring cyclic analog to digital converter embodying the capacitive-reference voltage switching technique of the present invention.

FIG. 3 is a block and schematic diagram of a non-restoring cyclic analog to digital converter and illustrates the capacitive-reference voltage switching technique. Generally, the non-restoring binary cyclic analog to digital converter of FIG. 3 comprises an input terminal 148 for receiving an analog signal, an amplifier 150 having a gain of two, i.e., resistors 152 and 154 are of equal ohmic value, a pair of capacitors 156 and 158 for providing an input signal at the non-inverting input 160 of amplifier 150, a plurality of switching devices 162, 164, 166, 168, and 170 for controlling the signals applied to input 160 and capacitors 156 and 158, switching devices 172 and 174 for controlling the charge built-up on capacitor 156, switching devices 176 and 178 for controlling the charge built-up on capacitor 159, a controller 180 for specifying the conduction state of switches 162, 164, 166, 168, 170, 172, 174, 176, and 178, and a comparator 182 for providing an input signal to controller 180, and a register 184 for recording the analog signal in digital form. In an optional configuration, high impedance, gain of one buffer amplifiers 186 and 188 are provided in order to minimize conversion errors when switches 168 and 170 are turned-on. In the following discussion, for convenience, a positive and a zero output from amplifier 150 produces a ONE at an output 190 of comparator 182 and a negative output from amplifier 150 produces a ZERO at output 190.

In the converter of FIG. 3, conversion is accomplished by a plurality of decisions, the first decision being a determination of the polarity of the analog signal and the remainder being a determination of the magnitude of the analog signal. Conversion is initiated by a start trigger 192, for example, which is applied to controller 180. Switch 162 is turned-on and switches 164, 166, 168, 170, 172, 174, 176, 178 are turned-off. The analog signal as at input terminal 148 is applied to input 160 via switch 162. A signal as at the output of amplifier 150, which is the same polarity as the input analog signal, is applied to comparator 182. If the analog signal as at 160 is positive, a ONE is presented at output 190 of comparator 182 and if the analog signal as at 160 is negative, a ZERO is presented at output 190. When the analog signal as at input terminal 148 is positive, the signal as at the output 190 of comparator 182 is recorded in register 184 for the second through fifth decisions. If the analog signal as at input terminal 148 is negative, the complement of the signal as at 190 is recorded in register 184 for the second through fifth decisions. Zero volts as the output of amplifier 150 is recorded in register 184 as a ONE. For convenience, the capacitive switching technique will now be described, particular reference being made to capacitor 156, switches 172 and 174, a ground 196 and a positive reference signal ($E''_{Ref}$). If the output as at 190 is ONE, i.e., a positive signal at the output of amplifier 150, switch 172 is turned-on and switch 174 is turned-off. The positive output of amplifier 150 is applied to capacitor 156 at 195 and the reference signal is applied to the capacitor at 199 via switch 172. The charge built-up on capacitor 156 is the output of amplifier 150 less the reference voltage. If the output as at 190 is negative, i.e., a negative signal at the output of amplifier 150, switch 172 is turned-off and switch 174 is turned-on. The negative output of amplifier 150 is applied to capacitor 156 at 195 and ground 196 is applied to capacitor 156 at 199 via switch 174. At this time, the charge built-up on capacitor 156 is the output of amplifier 150. Switch 172 is turned-on and switch 174 is turned-off. The charge built-up on the capacitor is the output of amplifier 150 plus the reference voltage. Therefore, by controlling the sequence of switching switches 172 and 174, the charge built-up on capacitor 156 is either the amplifier output minus the reference voltage of the amplifier output plus the reference voltage. In one example, the analog input as at input terminal 148 is a +9 volts and a +16 volt signal, $E''_{Ref}$, is applied to a terminal 194.

In the illustrated example, the charge built-up on capacitor 156, upon completion of the first decision, is +2 volts, i.e., +18 volts (output of amplifier 150) less the 16 volt reference signal. In the second decision, switches 166, 176, 168, 174, and 176 are turned-on and switches 162, 164 172, 170, 178 are turned-off. The +2 volt charge as on capacitor 156 is applied to input 160 of amplifier 150. The +4 volts output from amplifier 150 is applied to comparator 182 and a ONE is presented at 190. Since the signal as at the output of 150 was positive at the completion of the second decision, a ONE is recorded in register 184 as the most significant bit. The +4 volt output of amplifier 150 and the +16 volt reference signal are applied to capacitor 158 via switches 166 and 176, respectively. Therefore, the charge built-up on capacitor 158 is −12 volts. In the third decision, switches 164, 174, 178, and 170 are turned-on and switches 162, 166, 172, 176, and 168 are turned-off. The −12 volt charge as on capacitor 156 is applied to input 160. The −24 volt output from amplifier 150 is applied to comparator 182 and a ZERO appears at 190. Since the signal as at 190 is ZERO, a ZERO is recorded in register 184. Furthermore, the −24 volt output of amplifier 150 and ground 196 are applied to capacitor 156 via switches 164 and 174 respectively. Switch 174 is turned-off and switch 172 is turned-on. The charge built-up on capacitor 156 is a −8 volts, i.e., the −24 volts output of amplifier 150 plus the +16 volt reference signal as at 194. In the fourth decision, switches 166, 168, 174, and 178 are turned-on and switches 162, 164, 170, 172, and 176 are turned-off.

In the fifth decision, switches 164, 170, 174, and 178 are turned-on and switches 162, 166, 168, 172, and 176 are turned-off. The operation of the fourth and fifth decisions, analagous to that of the second and third decisions, causes a ZERO and ONE, respectively, to be presented at output 190 of comparator 182. The signal recorded in register 184 during the second through fifth decisions, inclusive, is 1001, which is the binary code for nine. In a modified configuration, the signal as in register 184 is applied to a display 197, for example, a numerical indicator, and the input analog signal is presented in numerical form.

Figure 4:
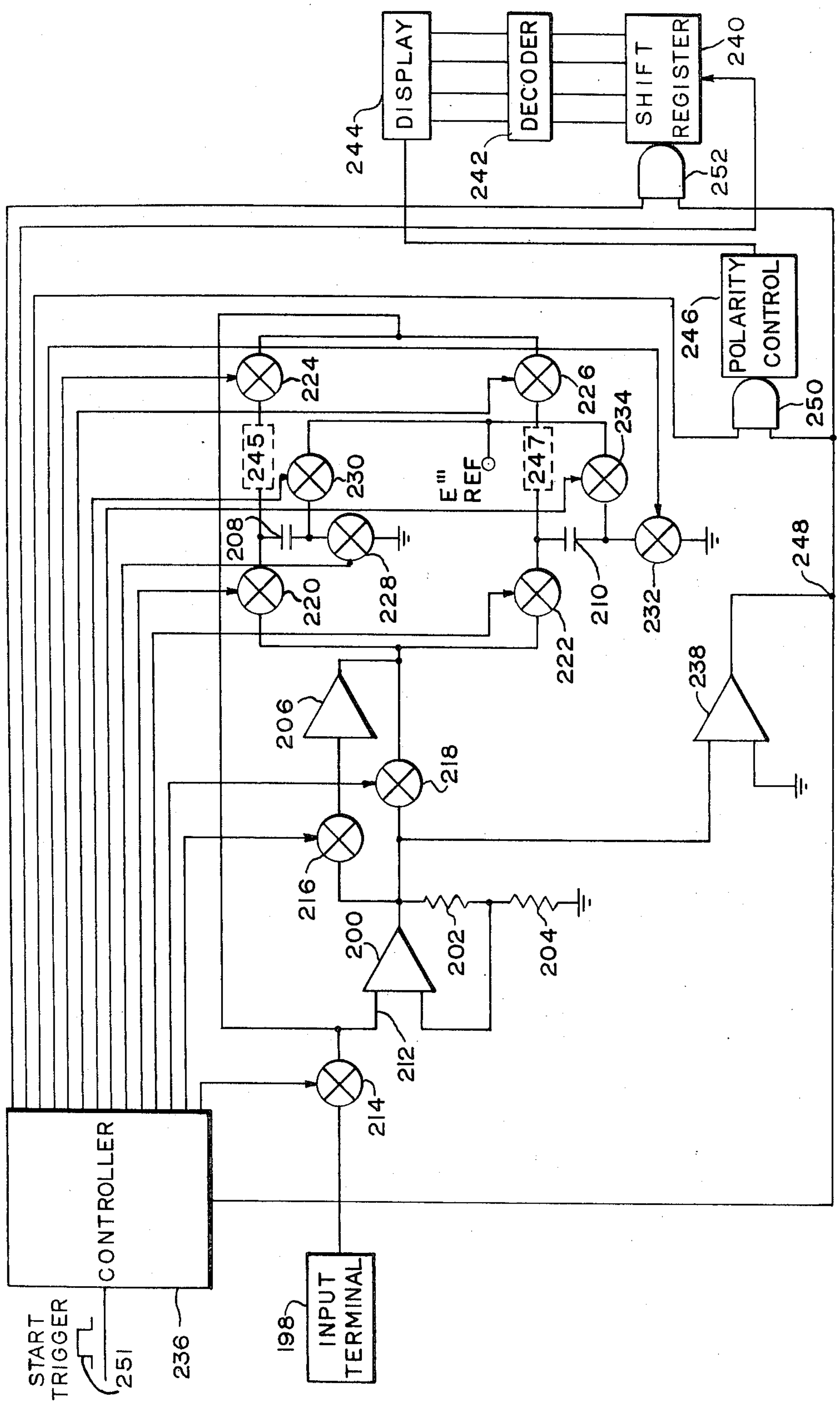
FIG. 4 is a block and schematic diagram of a non-restoring BCD cyclic analog to digital converter embodying the capacitive-reference voltage switching technique of the present invention.

FIG. 4 is a non-restoring BCD cyclic analog to digital converter and illustrates the capacitive-reference voltage switching technique. Generally, the non-restoring BCD cyclic analog to digital converter of FIG. 3 comprises an input terminal 198 for receiving an analog signal, an amplifier 200 having a gain of two, i.e., resistors 202 and 204 are of equal ohmic value, an amplifier 206 having a gain of five-sixteenths, a pair of capacitors 208 and 210 for providing an input signal at the non-inverting input 212 of amplifier 200, a plurality of switching devices 214, 216, 218, 220, 222, 224, and 226 for controlling the signals applied to amplifiers 200 and 206 and capacitors 208 and 210, switching devices 228 and 230 for controlling the charge built-up on capacitor 208, switching devices 232 and 234 for controlling the charge built-up on capacitor 210, a controller 236 for specifying the conduction state of switching devices 214, 216, 218, 220, 222, 224, 226, 228, 230, 232, and 234, a comparator 238 for providing an output terminal signal which represents the polarity of the output signal of amplifier 200, a shift register 240 for recording the analog signal in binary code, a decoder 242 for decoding the binary signal in shift register 240, a display 244 for presenting the analog signal in numerical form, and a polarity control 246 for providing a polarity signal to display 244. In an optional configuration, high impedance, gain of one amplifiers 245 and 247 are provided in order to minimize conversion errors when switches 224 and 226 are turned-on.

In the converter of FIG. 4, conversion is accomplished by a plurality of decisions, the first decision being a determination of the polarity of the analog signal and the remainder being a determination of the magnitude of the analog signal. Conversion is initiated by a start trigger 251, for example, which is applied to controller 236. Switch 214, 218, and 220 are turned-on and switches 216, 222, 224, 226, 228, 230, 232, and 234 are turned-off. The analog signal as at input 198 is applied to non-inverting input 212 via switch 214. An output from amplifier 200, which is the same polarity as the input analog signal, is applied to comparator 238. If the analog signal as at 212 is positive, a ONE is presented at an output 248 of comparator 238 and if the analog signal as at 212 is negative, a ZERO is presented at output 248. The signal as at 248 and a signal from controller 236 are applied to a logic circuit 250 at the input of polarity control 246. An output from the polarity control is applied to display 244 and the polarity of the input analog signal is presented on display 244. The signal as at 248 also is applied to controller 236. If the output as at 248 is ONE, switch 230 is turned-on and switch 228 is turned-off. As previously delineated in conjuction with description of the capacitive-reference voltage switching of FIG. 3, the charge built-up on capacitor 208 is the output of amplifier 200 less a reference voltage $E'''_{Ref}$. However, if the output as at 248 is ZERO, switch 228 is turned-on and switch 230 is turned-off. Thereafter, switch 230 is turned-on, switch 228 is turned-off and the capacitor is charged to the output of amplifier 200 plus the reference-voltage. The first decision is completed. If the analog signal as at input terminal 198 is positive upon completion of the first decision, the signal as at the output of comparator 238 is recorded in shift register 240 for the second through fifth decisions. When the analog signal as at input 198 is negative upon completion of the first decision, the complement of the signal as at output 248 is recorded in shift register 240 for the second through fifth decisions. If the output of amplifier 200 is positive upon completion of the sixth decision, the signal as at the output of the comparator 238 is recorded in shift register 240 for the seventh through tenth decisions. When the output of amplifier 200 is negative upon completion of the sixth decision, the complement of the signal as at output 248 is recorded in shift register 240 for the seventh through tenth decisions. Zero volts as at the output of amplifier 200 is recorded in shift register 240 as a ONE.

In the second decision, switches 218, 222, and 224 are turned-on and switches 214, 216, 220, 226, 232, and 234 are turned-off. The state of switches 228 and 230 is established in the first decision. The charge of capacitor 208 is applied to input 212 of amplifier 200 via switch 224 and the output of amplifier 200 is applied to comparator 238. The output of comparator 238, either ONE or ZERO, and a signal from controller 236 are applied to a logic circuit 252. The ONE or ZERO as at 248 is recorded in shift register 240 as the most significant bit. The signal as at 248 also is applied to controller 236. If the output as at 248 is ONE i.e., a positive output from amplifier 200, switch 234 is turned-on and switch 232 is turned-off. The charge built-up on capacitor 210 is the output of amplifier 200 less the reference voltage $E'''_{Ref}$. However, if the output as at 248 is zero, i.e., a negative output from amplifier 200, switch 232 is turned-on and switch 234 is turned-off. Thereafter, switch 232 is turned-off and switch 234 is turned-off and capacitor 210 is charged to the output of amplifier 200 plus the reference voltage. The second decision is completed. In the third decision, switches 218, 220, and 226 are turned-on and switches 214, 216, 222, 224, 228, and 230 are turned-off. The state of switches 232 and 234 is established in the second decision. The charge of capacitor 210 is applied to input 212 of amplifier 200 via switch 226. The output of amplifier 200 is applied to comparator 238. The output as at 248, either ONE or ZERO, and a signal from controller 236 are applied to logic circuit 252. The ONE or ZERO as at 248 is recorded in shift register 240. The signal as at 248 also is applied to control 236. Switches 228 and 230 are sequentially turned-on and off in a manner analagous to the switching delineated in the first decision. The description of the operational characteristics of the fourth and fifth decisions are similar to the delineation of the second and third decisions, respectively.

In the sixth decision, switches 216, 222, 224, and 232 are turned-on and switches 214, 218, 220, 226, and 234 are turned-off. The charge built-up on capacitor 208 during the fifth decision is applied to amplifier 200 via switch 224. The output of amplifier 224 is applied to amplifier 206 via switch 216. The output of amplifier 206 is applied to capacitor 210 via switch 222 and charge is built-up on capacitor 210. Furthermore, an output from controller 236 is applied to shift register 240. The recorded outputs of the second, third, fourth, and fifth decisions are shifted to decoder 242 and are decoded. The output signals from decoder 242 are applied to display 244 and are presented therein as a numerical indication of the decoded signal of the second through fifth decisions. Decisions two, three, four, and five are repeated as decisions seven, eight, nine, and 10. Decision six is then repeated as decision 11. In the illustrated converter of FIG. 4, there are 11 decisions, it will be understood that, in alternative embodiments, the number of decisions is other than 11, for example, 16.

Since certain changes may be made in the foregoing disclosure without departing from the scope of the invention herein involved, it is intended that all matter contained in the above description and shown in the accompanying drawings be construed in an illustrative and not in a limiting sense.

What is claimed is:

1. A method of charging a capacitor having first and second terminals for providing sum and difference signals related to a common reference signal, said method comprising the steps of:

a. establishing a first path for applying a first signal to said first terminal and for applying said reference signal to said second terminal, said first signal and said reference signal characterized by like polarities, said capacitor charged to a first voltage representing the difference between the magnitudes of said first signal and said reference signal;

b. interrupting said first path;

c. establishing a second path for applying a second signal to said first terminal and for sequentially applying a return signal and then said reference signal to said second terminal, said second signal and said reference signal characterized by unlike polarties, said capacitor charged to a second voltage representing the sum of said second signal and said reference signal.

* * * * *